United States Patent [19]

Gomyo

[11] Patent Number: 5,219,921
[45] Date of Patent: Jun. 15, 1993

[54] ELECTRICALLY INSULATING PAINT COMPOSITION AND CURED PRODUCT THEREOF

[75] Inventor: Shiro Gomyo, Gunma, Japan

[73] Assignee: Shin-Etsu Chemical Company, Ltd., Tokyo, Japan

[21] Appl. No.: 888,319

[22] Filed: May 27, 1992

Related U.S. Application Data

[63] Continuation of Ser. No. 549,044, Jul. 6, 1990, abandoned.

[30] Foreign Application Priority Data

Jul. 7, 1989 [JP] Japan ................. 1-176937

[51] Int. Cl.⁵ ............... C08K 3/10; C08K 3/36; C08L 83/07
[52] U.S. Cl. ..................... 524/781; 524/862; 524/786; 524/847; 524/779; 524/785; 524/780; 524/783; 524/789; 524/791
[58] Field of Search .......... 524/862, 786, 847, 779, 524/785, 780, 783, 781, 789, 791

[56] References Cited

U.S. PATENT DOCUMENTS

| | | | |
|---|---|---|---|
| 2,768,993 | 10/1956 | Drummond | 524/780 |
| 3,142,655 | 7/1964 | Bobear | 524/780 |
| 3,574,651 | 4/1971 | Nitzsche et al. | 524/780 |
| 3,957,713 | 5/1976 | Jeram et al. | 524/785 |
| 3,996,188 | 12/1976 | Laur | 524/780 |
| 4,157,426 | 6/1979 | Hatanaka et al. | 524/862 |
| 4,222,983 | 9/1980 | August et al. | 524/862 |
| 4,433,007 | 2/1984 | Marwitz et al. | 524/862 |
| 4,558,109 | 12/1985 | McAfee | 524/862 |
| 4,640,956 | 2/1987 | Toub et al. | 524/783 |
| 4,824,903 | 4/1989 | Aizawa et al. | 524/862 |
| 4,868,063 | 9/1989 | Okamura et al. | 524/862 |
| 4,946,893 | 8/1990 | Saito et al. | 524/785 |
| 5,008,307 | 4/1991 | Inomata | 524/862 |

Primary Examiner—John C. Bleutge
Assistant Examiner—Karen A. Dean
Attorney, Agent, or Firm—Millen, White, Zelano & Branigan

[57] ABSTRACT

An electrically insulating paint composition which is curable at low temperatures from about 60° C. to about 100° C., which comprises (A) an alkenyl group-containing, silanol group-free organopolysiloxane which is a copolymer of three kinds of siloxane units represented by the same general formula $(R^1)_a SiO_{(4-a)/2}$, wherein $R^1$ represents an unsubstituted or substituted monovalent hydrocarbon residue, and a's in three different units represent 0, 1 and 3 respectively, said copolymer containing at least two alkenyl groups in a molecule; (B) an organopolyhydrogensiloxane which is a homo- or copolymer containing at least one siloxane unit represented by the general formula $(R^2)_b SiO_{(4-b)/2}$, wherein $R^2$ represents hydrogen or an unsubstituted or substituted monovalent hydrocarbon residue, and b satisfies a relation $0 \leq b \leq 3$, said homo- or copolymer containing at least not less than two hydrogen atoms bonded directly to silicon atoms in a molecule; (C) a catalytic amount of platinum compound, and (D) an inorganic powder material comprising one or more of a metallic oxide and/or one or more of a metallic double oxide.

14 Claims, No Drawings

ID_921

ELECTRICALLY INSULATING PAINT COMPOSITION AND CURED PRODUCT THEREOF

This application is a continuation of application Ser. No. 07/549,044, filed Jul. 6, 1990 now abandoned.

FIELD OF THE INVENTION

This invention relates to an electrically insulating paint composition and, more particularly, to an electrically insulating paint composition which is curable in the temperature range of 60° C. to 100° C. and excellent in thermal resistance, flame resistance, solvent resistance, moisture resistance etc. and cured product thereof.

BACKGROUND OF THE INVENTION

As for the coating materials for electric insulation, especially the embedded type compounds, those obtained by compounding an organopolysiloxane of the type which can be cured by condensation polymerization with a catalyst for the condensation polymerization, an inorganic powder, an organic solvent and so on have so far been used exclusively. However, it is usually required for curing such compounds to heat them up to temperatures higher than 150° C. Even when powerful catalysts are used, it is as much as they can do to lower the curing temperature to about 120° C. Consequently, it takes 16 hours or more to effect the curing, that is to say, the producing efficiency is low. Under these circumstances, there is little hope of increasing the productivity, and what is worse, satisfactory properties cannot always be obtained.

In spite of such conditions, there has been a growing request for compounds capable of being cured at 100° C. or lower, preferably around 70° C., with the recent diversification of electric parts to be embedded in one case, particularly with the increase in demand for the embedment of thermal fuse. This is because electric parts, especially thermal fuse, must not be damaged by the thermal curing.

From such a viewpoint, a method of causing an organopolysiloxane containing alkenyl groups and an organopolyhydrogensiloxane, which contains hydrogen atoms bonded directly to silicon atoms, to undergo an addition reaction in the presence of a platinum catalyst and then curing the resulting adduct has been carried out up to now.

In this case, it is necessary to get rid of all silanol groups by the condensation reaction in the process of producing the alkenyl group-containing organopolysiloxane to be used as a reactant. This is because there is a necessity for preventing such a disadvantage that aside from the foregoing addition reaction, the remaining silanol groups react with the organopolyhydrogensiloxane containing hydrogen atoms bonded directly to silicon atoms owing to the catalytic action of the platinum compound to cause dehydrogenation and condensation reaction, resulting in shortening of pot life. In conventional compositions, however, a strong alkali or acid had to be used as a catalyst in order to get rid of the above-described silanol groups, whereby polymerization of the alkenyl groups took place. Consequently, it was difficult to obtain the intended alkenyl group-containing organopolysiloxane.

SUMMARY OF THE INVENTION

As the result of concentrating our energy on solutions for problems as described above, it has now been found that a catalyst to be used in getting rid of the silanol groups through condensation reaction can be rendered weak in alkalinity or acidity by employing a copolymer constituted by quadrifunctional siloxane units (Q units), trifunctional siloxane units (T units) and monofunctional siloxane units (M units) as the alkenyl group-containing organopolysiloxane, whereby the intended alkenyl group-containing, but silanol group-free organopolysiloxanes can be prepared with ease; but, on the contrary, when the alkenyl group-containing organopolysiloxane is constituted only by T units and D units (difunctional siloxane units) and does not contain any Q and M units, the silanol groups cannot be gotten rid of by using a weak alkali or acid as the catalyst; thus achieving this invention.

Therefore, an object of this invention is to provide an electrically insulating paint composition which has a long pot life, and can be cured at low temperatures from about 60° C. to about 100° C.

A second object of this invention is to provide an alkenyl group-containing organopolysiloxane which is free from silanol groups.

The above-described objects of this invention are achieved with an electrically insulating paint composition which comprises (A) an alkenyl group-containing organopolysiloxane which is a copolymer of three kinds of siloxane units represented by the same general formula $(R^1)_a SiO_{(4-a)/2}$, wherein $R^1$ represents an unsubstituted or substituted monovalent hydrocarbon residue, and a's in three different units represent 0, 1 and 3 respectively, said copolymer containing not less than two alkenyl groups in a molecule; (B) an organopolyhydrogensiloxane which is a homo- or copolymer containing at least one siloxane unit represented by the general formula $(R^2)_b SiO_{(4-b)/2}$, wherein $R^2$ represents hydrogen or an unsubstituted or substituted monovalent hydrocarbon residue, and b satisfies a relation $0 < b \leq 3$, said homo- or copolymer containing not less than two hydrogen atoms bonded directly to silicon atoms in a molecule; (C) a catalytic amount of platinum compound, and (D) an inorganic powder material comprising one or more of a metallic oxide and/or a metallic double oxide.

DETAILED DESCRIPTION OF THE INVENTION

In the general formula $(R^1)_a SiO_{(4-a)/2}$, which represents the constituting units of the component (A), $R^1$ represents an unsubstituted or substituted monovalent hydrocarbon residue, particularly preferably an alkyl group containing 1 to 6 carbon atoms, a phenyl group or an alkenyl group; and "a" represents 0, 1 and 3. When "a" is 0 the formula is indicated by $SiO_2$, when "a" is 1 the formula is $R_1 SiO_{3/2}$, and when "a" is 3 the formula is $(R_1)_3 SiO_{\frac{1}{2}}$. More concretely, $SiO_2$ in the case of $a=0$ is a quadrifunctional unit prepared by hydrolytic condensation of a raw material including an alkylsilicate represented by $Si(OCH_3)_4$, $Si(OC_2H_5)_4$, $Si(OC_3H_7)_4$ or the like, a silicon tetrahalide represented by $SiX_4$ or its partial hydrolysis products, water glass or so on.

$R^1 SiO_{3/2}$ in the case of $a=1$ is a trifunctional unit including siloxane units prepared by hydrolytic condensation of organotrichlorosilanes, such as $CH_3 SiCl_3$, $C_2H_5SiCl_3$, $C_3H_7SiCl_3$, $C_4H_9SiCl_3$, $CH_2=CH.SiCl_3$, $C_6H_5SiCl_3$; organotrialkoxysilanes such as $CH_3Si(OCH_3)_3$, $CH_3Si(OC_2H_5)_3$, $C_2H_5Si(OCH_3)_3$, $C_2H_5Si(OC_2H_5)_3$, $C_3H_7Si(OCH_3)_3$, $C_4H_9Si(OCH_3)_3$, $CH_2=CHSi(OCH_3)_3$, $CH_2=CHCH_2Si(OCH_3)_3$, $CH_2=C(CH_3)Si(OCH_3)_3$, $CH_2=CHSi(OC_2H_5)_3$, $C_6H_5Si(OCH_3)_3$, $C_6H_5Si(OC_2H_5)_3$;

$(R^1)_3SiO_{\frac{1}{2}}$ in the case of a=3 is a monofunctional unit including siloxane units prepared by hydrolytic condensation of a raw material including triorganochlorosilanes such as $(CH_3)_3SiCl$, $(CH_3)_2.CH_2=CH.SiCl$, $(C_2H_5)_3SiCl$, $(CH_3)_2C_6H_5SiCl$, $(C_2H_5)_2CH_2=CHSiCl$, etc.; organomonoalkoxysilanes such as $CH_2=CHCH_2Si(CH_3)_2OCH_3$ and $CH_2=C(CH_3)Si(CH_3)_2OCH_3$ etc. or so on; and dimers prepared by hydrolytic condensation reaction of these triorganochlorosilanes, such as $((CH_3)_3Si)_2O$, $((CH_3)_2(CH_2=CH)Si)_2O$, $((C_2H_5)_3Si)_2O$, $((CH_3)_2(C_6H_5)Si)_2O$, $((C_2H_5)_2(CH_2=CH)Si)_2O$, etc.

The monomer is quadrifunctional when the number of $R^1$'s, that is, the value of "a", is 0, it is trifunctional when "a" is 1, and it is monofunctional when "a" is 3. Alkenyl group-containing organopolysiloxanes can be prepared by making all the monomers corresponding to a=0, a=1 and a=3 and/or a mixture of partial hydrolysis condensates of these monomers undergo cohydrolytic condensation polymerization.

In this case, it is necessary for these monomers to be mixed in advance in such a compounding ratio that at least two or more alkenyl groups may be contained in one copolymer molecule.

As for the compounding molar ratio among the differently functional siloxane units, the cured copolymer generally acquires harder and more brittle property, the greater the fraction of the quadrifunctional siloxane units in the copolymer becomes. On the other hand, the larger the fraction of the trifunctional siloxane units and the smaller the fraction of quadrifunctional siloxane units, the less hard and the less brittle the cured matter. In addition, when the fraction of monofunctional units is increased, the resulting copolymer becomes a viscous liquid, and a curing treatment can only make it soft solid or, in some cases, leave it as it is in liquid state. Accordingly, the molar fractions of the different functional siloxane units in the copolymer have their individual limits as a matter of course.

A preferred compounding ratio of the monofunctional siloxane units to the quadrifunctional siloxane units to the trifunctional siloxane units is 0.5–1.3:0-.6–1.4:0.1–0.8 by mole. When the compounding ratio is selected from the above-described range, it becomes feasible to cure the electrically insulating paint composition of this invention at low temperatures, and characteristics of the cured composition, including heat resistance, flame resistance, solvent resistance and moisture resistance, can be improved satisfactorily.

In addition, although it is essential for the copolymer to contain at least two alkenyl groups in a molecule, the alkenyl group content in the copolymer ranges preferably from 5 to 30 mol %, and it is optimal in the range of 10 to 20 mol %.

Therefore, it is unnecessary for all the foregoing $R^1$'s to be the same.

The most preferred alkenyl groups is $CH_2=CH-$.

Of the organic groups represented by $R^1$, other than alkenyl group, methyl group is most preferred in respects of thermal resistance, flame resistance, solvent resistance, moisture resistance, curing facility and so on.

Of course, there is no objection to the introduction of an alkyl group containing many carbon atoms or phenyl group as part of $R^1$'s with the intention of imparting special use or characteristics to the composition.

In the general formula $(R^2)_bSiO_{(4-b)/2}$, which represents the constituting units of the component (B), $R^2$ represents an alkyl group containing 1 to 6 carbon atoms, a phenyl group or a hydrogen atom; and b satisfies the relation $0<b\leq 3$.

The foregoing component (B) is a polymer constituted by at least one kind of siloxane units, and corresponds to an organopolyhydrogensiloxane which contains in a molecule at least two hydrogen atoms bonded directly to silicon atoms.

Specific examples of such an organopolyhydrogensiloxane include

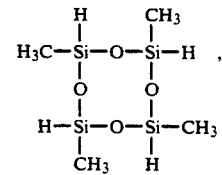

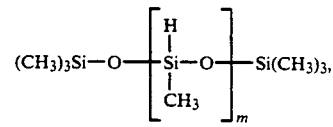

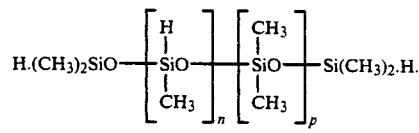

In the above formulae, m, n and p are rational numbers of 2 or more, 0 or more and 1 or more, respectively, but smaller than polymerization degrees of their corresponding polymers of the kind which have compatibility with the above-described alkenyl group-containing organopolysiloxane.

As additional examples of the foregoing organopolyhydrogensiloxane, mention may be made of the products obtained by cohydrolysis condensation between $(C_2H_5O)_4Si$ and/or partial hydrolysis products thereof and $CH_3.H.Si(OCH_3)_2$ or $(CH_3)_3SiOSi(CH_3)_3$; the products obtained by cohydrolysis condensation among the four kinds of organosilanes, comprising the above-cited ones and $CH_3Si(OCH_3)_3$; and the products obtained by cohydrolysis condensation among the three kinds of organochlorosilanes, comprising $C_6H_5SiCl_3$, $CH_3.H.SiCl_2$ and $(CH_3)_2SiCl_2$.

An amount of these organopolyhydrogensiloxanes to be compounded, though does not have any particular limitation, becomes proper when the number of hydrogen atoms bonded directly to silicon atoms ranges from 0.7 to 10 per one alkenyl group in the alkenyl group-containing organopolysiloxane.

Platinum compounds to be used in a catalytic amount can be properly chosen from those well-known as catalysts for the addition reaction between an alkenyl group and a hydrogen atom bonded directly to silicon atom, such as chloroplatinic acid, a complex prepared from chloroplatinic acid and an olefin or a vinylsiloxane, an alcohol solution of chloroplatinic acid, or the like.

A proper amount of the above-described platinum compounds to be compounded, though does not have any particular limitation, generally ranges from 1 to 400 parts by weight, based on platinum metal, per 1,000,000 by weight of the combination of the alkenyl group-containing organopolysiloxane with the organopolyhydrogensiloxane which contains hydrogen atoms bonded directly to silicon atoms.

In this invention, additives known as retarders for the above-described addition reaction, such as alkynyl alcohol compounds, amines, mercaptanes and so on, can be used in appropriate amounts for the purpose of controlling the speed of the addition reaction caused by the addition of platinum compounds as cited above.

The inorganic powder to be used in this invention comprises at least one kind of powdered metallic oxide and/or at least one kind of powdered metallic double oxide. Specific examples of a usable metallic oxide include $Al_2O_3$, $SiO_2$, $MgO$, $Fe_2O_3$, $ZnO$, $Sb_2O_3$, $TiO_2$, $Fe_3O_4$, $CuO$, $CoO$ and so on. Among these oxides, $Al_2O_3$, $SiO_2$, $MgO$ and $Fe_2O_3$ are preferred in particular. As for the metallic double oxides, $Al_2O_3.2SiO_2$ (clay), $3MgO.4SiO_2$ (talc), $Al_2O_3.5SiO_2$ (bentonite) and so on can be given as specific examples. As amount of these inorganic powders to be compounded depends on the form and the use of the paint composition. In general, it can be chosen properly from such a compounding range that the content of the alkenyl group-containing organopolysiloxane and that of the hydrogen-containing organopolyhydrogensiloxane may amount to 5 to 1,000 parts by weight in all per 100 parts by weight of these inorganic powders.

This is because it is desirable from the standpoint of satisfactorily fulfilling their various functions that the inorganic powders should be compounded in a large amount when the paint composition is used in making an embedded resistor or sealing the terminal part of a sheathed heater, whereas when it is used for affording protective insulation to the surface of printed substrate they should be compounded in a small amount.

The above-described inorganic powders are not particularly limited with respect to grain size, but generally have a grain size of 200 microns or less, preferably 100 microns or less. It is desirable that the grain size and the grain size distribution of the inorganic powders be chosen depending on the form and the use of the coating material to be prepared.

Since the electrically insulating paint composition of this invention can be cured at much lower temperatures than conventional compositions, it enables electric and electronic parts liable to be damaged at comparatively low temperatures to be molded or coated as an undivided whole, thereby accomplishing improvements in working efficiency and productivity.

In addition, as the paint composition of this invention can be cross-linked more closely than in the conventional curing process utilizing condensation polymerization, it can acquire enhanced resistances to solvent and moisture, notwithstanding the lowness of the curing temperature.

Further, as the hardness of the resin itself can be heightened due to the use of quadrifunctional siloxane units, the mixture of the organopolysiloxane containing alkenyl groups with the organopolysiloxane containing hydrogen atoms bonded directly to silicon atoms can be compounded with the inorganic powder in a reduced proportion, compared with conventional resins, whereby improvements in thermal resistance and flame resistance are effected.

As described above in detail, the electrically insulating paint composition of this invention can be cured at a low temperature ranging from 60° C. to 100° C. and, what is better, the cured composition is excellent in thermal resistance, flame resistance, solvent resistance, moisture resistance and so on, and bears satisfactory electric insulation characteristics. Accordingly, this paint composition is best suited for various uses, e.g., as the compound for embedded type resistors, as the insulating paint for resistance element, as the paint for molds of condensers, and further as the mold of IC, LSI or the like, as the agent for sealing the terminal parts of a cassette heater, a sheathed heater or the like, as the adhesive sealing agent for metallic caps of electric bulbs, and as the insulating paint for the heating part of thermal instruments.

EXAMPLES

This invention will now be described in more detail by reference to the following examples. However, the invention should not be construed as being limited to these examples. Additionally, all parts in the following examples are by weight unless otherwise indicated.

EXAMPLE 1

In a four-neck flask equipped with a reflux condenser, a thermometer and a stirrer, 1,000 parts of ethylpolysilicate ($SiO_2$ content: 40%), 324 parts of hexamethyldisiloxane, 176 parts of vinyltrimethoxysilane and 204 parts of toluene were placed and mixed. Thereto, a mixed solution containing 18 parts of 35% hydrochloric acid and 18 parts of isopropanol was added with stirring, and subsequently 360 parts of water was added dropwise over a 1-hour period. Though the temperature inside the flask rose to 45° C. during the water addition, the reaction system was further heated up to 75° C. and underwent hydrolysis over a 5-hour period in a refluxed condition.

Thereafter, a procedure of washing and separating the reaction product using 2,000 parts of water and a separatory funnel was repeated until the resulting aqueous phase became neutral. Then, the organic phase was transferred into the four-neck flask, and subjected to azeotropic dehydration in order to adjust the concentration of the nonvolatile component to 80%. Thereafter, 8 parts of sodium hydrogencarbonate was added to the resulting organic phase and the heating for keeping the reaction system at 120° C. was continued for 7 hours to effect polymerization.

Then, the concentration of the nonvolatile component was controlled to 60% by the addition of toluene, and to the toluene solution were added 12 parts of 35% hydrochloric acid and 60 parts of water. The resulting mixture was heated at 90° C. for 2 hours to effect neutralization. The residual hydrochloric acid was removed by a washing treatment repeated until the aqueous phase become neutral. The organic phase was submitted to azeotropic dehydration, and successively cooled, dehydrated by the addition of 10 parts of anhydrous Glauber's salt and filtered. 100 parts of the thus obtained varnish was homogeneously admixed with 0.07 part of 2 weight % isopropanol solution of chloroplatinic acid to prepare homogeneous varnish. Properties of the resulting varnish were as follows:

appearance: pale yellow transparent liquid concentration of the nonvolatile component: 60.3%
viscosity: 7.2 cs
specific gravity: 1.031
solvent: toluene The compounding ratio of the monofunctional siloxane units to the quadrifunctional siloxane units to the trifunctional siloxane units was 0.6:1.0:0.18, and the content of vinyl groups was 10.0 mol %. In other word, 0.088 mole of vinyl group was contained in 100 g of the varnish.

In the next place, a 20 parts portion of the thus obtained varnish was compounded with 70 parts of natural silica (ground quartz) powder and 5 parts of bentonite, and thereto was added 2 parts of organopolyhydrogensiloxane containing hydrogen atoms bonded directly to silicon atoms and represented by the following average compositions;

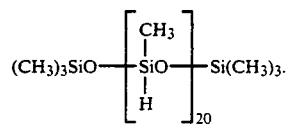

Further, toluene was added till the compounded matter came to assume a paste-like form. Then, the toluene was evaporated in order that the molding of the compounded matter might have a thickness of 1 mm. The molding was heated at 70° C. for 3 hours to effect curing. As for the electric characteristics of the molding, the dielectric strength was 28 KV/mm and the volume resistivity was $5.6 \times 10^{14}$ Ω−cm. In addition, the molding was excellent in freon-proofing property.

EXAMPLE 2

In a four-neck flask equipped with a reflux condenser, a thermometer and a stirrer, 700 parts of methylpolysilicate (SiO$_2$ content: 51%), 434 parts pf hexamethyldisiloxane, 418 parts of vinyltrimethoxysilane and 254 parts of xylene were placed and mixed. Thereto, a mixed solution containing 15 parts of 35% hydrochloric acid and 15 parts of isopropanol was added with stirring, and subsequently 420 parts of water was added dropwise over a 80-minute period.

The reaction system was heated at 69° C. under reflux for 5 hours to undergo hydrolysis. Thereafter, a procedure of washing and separating the reaction product using 2,000 parts of water and a separatory funnel was repeated until the resulting aqueous phase became neutral.

Then, the organic phase was subjected to azeotropic dehydration in order to adjust the concentration of the nonvolatile component to 80%. Thereafter, 7 parts of sodium hydrogencarbonate was added to the resulting organic phase and the heating for keeping the reaction system at 120° C. was continued for 7 hours to effect polymerization. Then, the concentration of the nonvolatile component was controlled to 60% by the addition of xylene. Further, 11 parts of 35% hydrochloric acid and 50 parts of water were added to the xylene solution, and heated at 90° C. for 2 hours to effect neutralization.

Then, washing and separating treatments were repeated until the aqueous phase become neutral. Thereafter, the organic phase was dehydrated, and then filtered. 100 parts of the thus obtained varnish was admixed with 0.13 part of 2 weight % isopropanol solution of chloroplatinic acid to prepare homogeneous varnish. Properties of the resulting varnish were as follows:
appearance: pale yellow transparent liquid
concentration of the nonvolatile component: 59.5%
viscosity: 6.8 cs
specific gravity: 1.027
solvent: xylene The compounding ratio of the monofunctional siloxane units to the quadrifunctional siloxane units to the trifunctional siloxane units was 0.9:1.0:0.47, and the content of vinyl groups was 20.0 mol %. In other words, 0.166 mole of vinyl group was contained in 100 g of the varnish.

In the next place, a 100 parts portion of the thus obtained varnish was compounded with 50 parts of Fe$_2$O$_3$ (red iron oxide) and 70 parts of alumina powder, and thereto was added xylene in order that the compounded matter might assume a paste-like form. Further, the compounded matter was kneaded with a three-rod roll mill to prepare red paste.

The thus prepared paste was admixed with 80 parts of organopolyhydrogensiloxane represented by the following average composition;

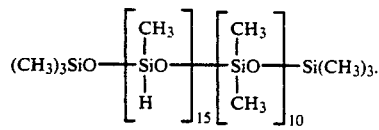

Further, xylene was added to dilute the paste till the diluted paste came to have suitable viscosity for coating. The thus obtained paint was coated on an iron plate so that the coat might have a thickness of 1 mm. The coat was heated at 70° C. for 3 hours to effect curing. As for the electric characteristics of the coat, the dielectric strength was 6.0 KV/0.1 mm and the volume resistivity was $8.0 \times 10^{15}$ Ω−cm. In addition, the coat had satisfactory solvent resistance with respect to 1,1,1-trichloroethane.

EXAMPLE 3

In a four-neck flask equipped with a reflux condenser, a thermometer and a stirrer, 600 parts of methylpolysilicate (SiO$_2$ content: 51%), 454.4 parts of hexamethyldisiloxane, 317 parts of vinyltrimethoxysilane, 194.5 parts of trimethoxysilane and 256 parts of xylene were placed and mixed. Thereto, a mixed solution containing 15 parts of 3% hydrochloric acid and 15 parts of isopropanol was added with stirring, and subsequently 880 parts of water was added dropwise over a 2-hour period. The reaction system was heated at 69° C. under reflux for 5 hours to undergo hydrolysis. Thereafter, a procedure of washing and separating the reaction product using 2,000 parts of water and a separatory funnel was repeated until the resulting aqueous phase became neutral. Then, the organic phase was subjected to azeotropic dehydration in order to adjust the concentration of the nonvolatile component to 80%. Thereafter, 7 parts of sodium hydrogencarbonate was added to the resulting organic phase and the heating for keeping the reaction system at 120° C. was continued for 7 hours to effect polymerization. Then, the concentration of the nonvolatile component was controlled to 60% by the addition of xylene.

Further, 11 parts of 35% hydrochloric acid and 50 parts of water were added to the xylene solution, and heated at 90° C. for 2 hours to effect neutralization. Then, washing and separating treatments were repeated until the aqueous phase become neutral. Thereafter, the organic phase was dehydrated, and then filtered. 100 parts of the thus obtained varnish was admixed with 0.1 part of 2 weight % isopropanol solution of chloroplatinic acid to prepare homogeneous varnish. Properties of the resulting varnish were as follows:
appearance: pale yellow transparent liquid
concentration of the nonvolatile component: 60.5%
viscosity: 7.3 cs
specific gravity: 1.300
solvent: xylene The compounding ratio of the monofunctional siloxane units to the quadrifunctional siloxane units to the trifunctional siloxane units was 1.1:1.0:0.7, and the content of vinyl groups was 15 mol %. In other words, 0.126 mole of vinyl group was contained in 100 g of the varnish.

In the next place, a 50 parts portion of the thus obtained varnish was compounded with 100 parts of neutral silica (ground quartz) and 50 parts of magnesia powder and thereto was added toluene. The compounded matter was kneaded so as to assume a paste-like form. The thus prepared paste was admixed with 15 parts of the same organopolyhydrogensiloxane as used in Example 1, and coated on an iron plate equipped with a frame for adjusting a thickness of the coat to 1 mm. The coat was molded by being heated at 70° C. for 2 hours as a pressure of 2 Kg/m$^2$ was applied thereto.

As for the electric characteristics of thus formed molding, the dielectric strength was 30 KV/mm and the volume resistivity was $3.5 \times 10^{15}$ Ω−cm. In addition, the molding had satisfactory solvent resistance with respect to tetrachloroethylene.

What is claimed is:

1. An electrically insulating paint composition which comprises (A) an alkenyl group-containing organopolysiloxane free from silanol groups which is a copolymer consisting essentially of three kinds of siloxane units represented by the same general formula $(R^1)_aSiO_{(4-a)/2}$, monofunctional siloxane units (M) of the formula $R^1_3SiO_{0.5}$ (a=3), quadrifunctional siloxane units (Q) of the formula $SiO_2$ (a=0) and trifunctional siloxane units (T) of the formula $R^1SiO_{1.5}$ (a=1) with no difunctional siloxane units $R^1_2SiO$ (a=2), said siloxane units (M), (Q), (T) being present in said copolymer in a molar ratio of 0.5–1.3 to 0.6–1.4 to 0.1–0.8, respectively, and wherein $R^1$ represents a substituted or unsubstituted monovalent hydrocarbon residue, said copolymer containing at least two alkenyl groups in a molecule, and the proportion of alkenyl groups range from 5–30 mol % of the total $R^1$ monovalent hydrocarbon residues in a molecule; (B) an organopolyhydrogen-siloxane which is a homo- or copolymer containing at least one siloxane unit represented by the general formula $(R^2)_bSiO_{(4-b)/2}$, wherein $R^2$ represents hydrogen or an unsubstituted or substituted monovalent hydrocarbon residue, and b satisfies a relation $0<b\leq 3$, said homo- or copolymer containing at least two hydrogen atoms bonded directly to silicon atoms in a molecule; (C) a catalytic amount of platinum compound; and (D) an inorganic powder material comprising one or more of a metallic oxide and/or a metallic double oxide.

2. The electrically insulating paint composition of claim 1, wherein $R^1$ in the general formula of said component (A), $(R^1)_aSiO_{(4-a)/2}$, is a monovalent hydrocarbon residue containing up to 6 carbon atoms, which is selected from the group consisting of an alkyl of 1 to 6 carbon atoms, phenyl and alkenyl.

3. The electrically insulating paint composition of claim 1, wherein said content of the alkenyl groups in one molecule of the copolymer ranges from 10 to 30 mol %.

4. The electrically insulating paint composition of claim 1, wherein at least one of the alkenyl groups contained in one molecule of the copolymer of said component (A) is a vinyl group, α-methylvinyl group or allyl group.

5. The electrically insulating paint composition of claim 1, wherein organic groups, other than alkenyl groups, in said component (A) are methyl.

6. The electrically insulating paint composition of claim 4, wherein all of said alkenyl groups, contained in one molecule of the copolymer of the component (A), are vinyl groups.

7. The electrically insulating paint composition of claim 1, wherein said component (B) is compounded in such an amount that the number of hydrogen atoms bonded directly to silicon atoms in the component (B) corresponds to from 0.7 to 10 per one alkenyl group in component (A).

8. The electrically insulating paint composition of claim 1, wherein a platinum compound of said component (C) is added in a proportion of 1 to 400 parts by weight, based on platinum metal, to 1,000,000 parts by weight of the combination of component (A) with component (B).

9. The electrically insulating paint composition of claim 1, which additionally contains a retarder for controlling the speed of the addition reaction between said component (A) and said component (B).

10. The electrically insulating paint composition of claim 1, wherein a content of said components (A) and that of said component (B) amount of 5 to 1,000 parts by weight in all per 100 parts by weight of said component (D).

11. The electrically insulating paint composition of claim 1, wherein a grain size of said component (D) is 200 microns or less.

12. The electrically insulating paint composition of claim 11, wherein said grain size of the component (D) is 100 microns or less.

13. A cured product which is obtained by curing the composition of claim 1.

14. The electrically insulating paint composition of claim 1, wherein said component (B) is selected from the group consisting of $H(R^2)_2SiOSi(R^2)_2H$,

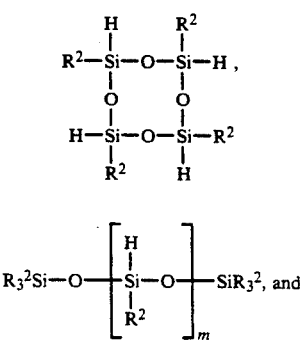

-continued
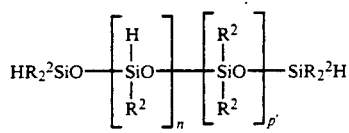
wherein
R² is hydrogen or an unsubstituted or substituted monovalent hydrocarbon residue; and
n, m, and p are rational numbers of 2 or more, 0 or more, and 1 or more, respectively.
* * * * *